Oct. 28, 1952
A. WRIGHT
2,615,575
CONTINUOUS ROTARY FILTER
Filed Oct. 29, 1946
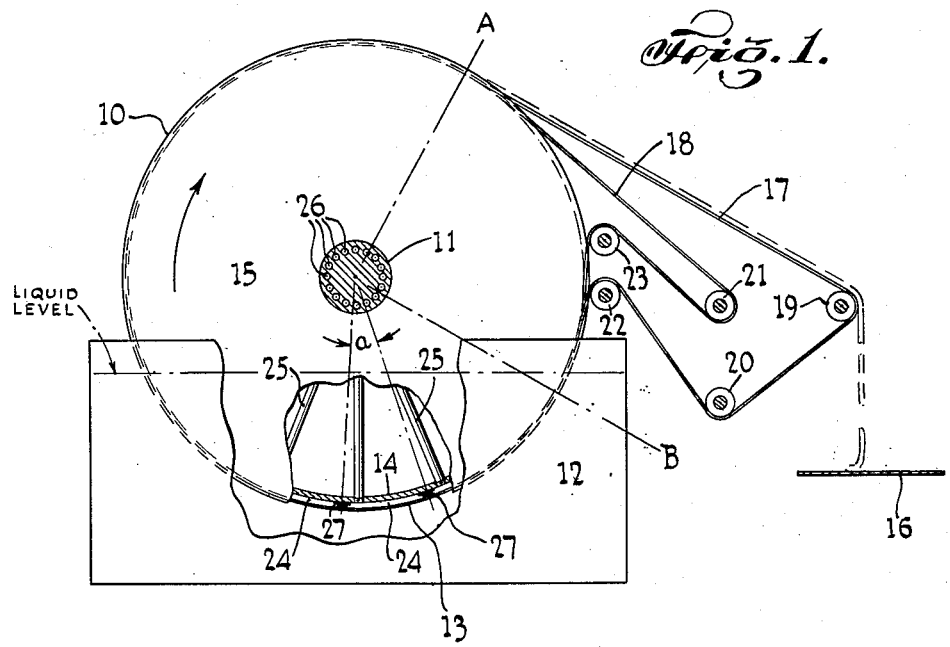
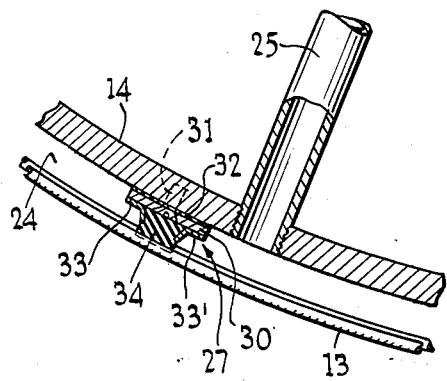
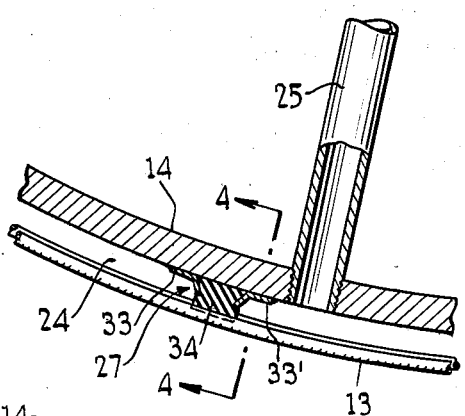
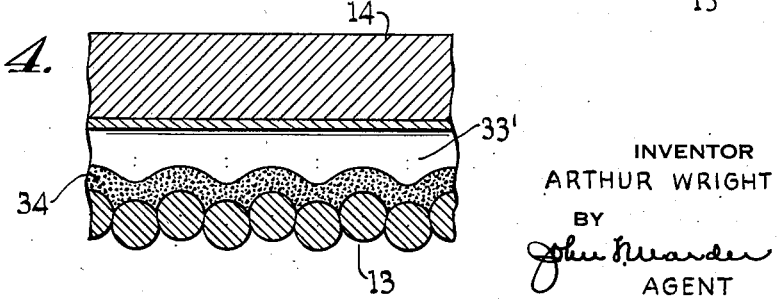
INVENTOR
ARTHUR WRIGHT
BY
AGENT Patented Oct. 28, 1952

2,615,575

UNITED STATES PATENT OFFICE 2,615,575

CONTINUOUS ROTARY FILTER

Arthur Wright, Upper Montclair, N. J.; Anna Rose Wright executrix of said Arthur Wright, deceased Application October 29, 1946, Serial No. 706,437

3 Claims. (Cl. 210—199)

This invention relates to improvements in continuous rotary drum filters and in particular to improved means to effect a vacuum seal on the surface of a filter drum between the drum and a filter web.

My invention is directed particularly to the type of rotary filter which utilizes a cylindrical drum partially submerged in a tank of liquor to be filtered, wherein the solid matter is drawn by vacuum to, carried on, and discharged from a filter web trained about the cylindrical surface of the drum, while the effluent remainder from the filtering process which is drawn through the web to the interior of the drum is carried away from the drum through suitable piping associated with the drum trunnions.

A suitable expedient for applying vacuum only over that portion of the drum periphery where it is desired is to arrange for its application to segmental portions of the cylindrical surface which portions are suitably sealed from one another. Valve gearing may be utilized so that only those segments which are submerged in liquid or are lying between the tank and the discharge having accumulated cake thereon have vacuum applied thereto. As the drum rotates the valve mechanism is continuously adjusted for the correct vacuum distribution.

An important consideration in sectionalizing the vacuum distribution is the problem of creating a linear vacuum seal along the drum surface between the filter web and the drum. Irrespective of the interior construction of the drum and the valve arrangements for vacuum distribution, which vary with specific filter designs, it is necessary to effectively seal the juncture of the filter element or web and the drum along the lines which divide the independent segmental portions, and it is the principal object of this invention to provide for such seal.

The types of filter web or element used may also vary with specific filter designs. In my Patent No. 2,247,460 the web comprises a series of cord convolutions in abutting relationship on the drum during filtering and trained away from the drum in two separate paths for cake discharge. It is a further object of the invention to provide a seal between the filter drum and the web of a continuous rotary filter which uses a filter element or web comprising a series of convolutions of cord of the type described in my aforementioned patent.

Still further objects of the invention include the provision of an improved sealing strip for continuous rotary drum filters which may be fabricated for use with new filter construction or which may be added to rotary drum filters in the field to adapt such installations to the use of cord filter elements, and which may be readily replaced when necessary due to damage or wear.

The novel features which I believe to be patentable are pointed out in the appended claims. It will be understood that the improved apparatus which I have devised is the preferred embodiment of my invention.

In the drawing,

Figure 1 is a diagrammatic side elevation view, partially cut away, showing a continuous rotary drum filter which incorporates construction according to my invention;

Figure 2 is an enlarged fragmentary section view of a portion of the instrumentalities of Figure 1 illustrating certain features of my invention;

Figure 3 is an enlarged fragmentary section view similar to Figure 2, showing alternative construction; and Figure 4 is a partial cross-section view taken along the lines 4—4 of Figure 3.

Referring to Figure 1 where I have shown some of the basic elements of a continuous rotary filter, the numeral 10 refers to a drum which is fixed to rotate on trunnions 11 and is partially submerged in a tank 12 of liquor to be filtered. A usual application for such a filter is in the treatment of municipal sewage where, after treating and partially settling out solids from sewage, a final filtering process is used to remove the remaining solid materials from the suspension. Other applications of continuous rotary filters are evident in connection with the separation of solids from liquors in sugar refining, the brewing and canning industries and in various other processing.

The drum is caused to revolve in a clock-wise direction and vacuum is used to draw liquid through the filter web 13 supported in a suitable manner on the drum surface 14. The filter web forms a continuous layer across the drum between the drum heads 15, as is well known in the art of filtering; and in this particular application a series of contiguous cord convolutions form the web, the cords being spaced apart on the drum on centers slightly less than the diameter of a single cord so that the pattern of cords is alternately a low cord convolution resting on the drum and a high cord convolution riding off the drum supported between two convolutions resting on the drum. The cords are trained away from the drum at line A for discharging cake as to a conveyor belt 16. It is not necessary that the drum heads be solid but on the contrary they may consist only of a ring extending from the drum surface 14 a sufficient radial distance beyond the drum to provide for end sealing with web 13. Separation of the cords is effected as they are trained away into two non-contiguous layers of cord convolutions 17 and 18 with the top layer 17 directed over a pair of cylindrical directioning rollers 19 and 20 while the lower layer is trained over roller 21 for reversal of direction. Thereupon the top and bottom layers are re-directed to the drum in order to re-form the contiguous layers of cord convolutions by directing them over rollers 22 and 23 respectively.

The drum 10 is divided into a number of equal segmental sections, the radial dividing lines of which form the angle $a$ at the center of the drum. Vacuum is applied to the individual segmental spaces 24 lying between the segmental surface of the drum and the filter web through pipes 25, which are, in turn, connected with intermediate valve mechanism located between the source of vacuum, not illustrated, and the piping header connections 26 in the drum trunnion. The valve arrangements are such that vacuum is only applied to those segments lying between line B where a complete segment clockwise of the drum is submerged in liquor and line A where discharge is effected.

Division of the segmental portions is made at the sealing strips 27, which overlie the drum cylinder for the entire length of the drum, creating spaces 24 through which effluent may be drawn to pipes 25. While I have illustrated a substantial opening at these locations there would be no actual spacing in practice between the web and the cylinder, in fact, the web would lie directly on the drum surface with a slight arching at the sealing strips 27, and the clear liquid would be drawn through interstices in the cord web formation to channels formed between the successive convolutions of cord on the drum. Drainage would then follow these channels and would collectively flow to pipes 25 situated adjacent to the sealing strips 27 where the slight arching of the cords away from the drum would permit intercommunication between the separate channels.

Referring now to Figure 2, where I follow with details of the sealing strips 27, a flat rectangular plate 30 is fastened on the drum surface across the drum by means of machine screws 31, and a gasket 32 inserted between the plate 30 and the drum surface forms a seal at this joint. A pair of angular supporting strips 33, 33', which likewise run the entire distance across the drum, are soldered or otherwise suitably fixed to the plate 30, forming a dove-tailed support for a resilient or self-deforming sealing member 34. The web of cords overlies the sealing member 34 and presses against the resilient or self-deforming material creating a surface configuration as shown in Figure 4 across the drum cylinder.

Member 34 may be composed of rubber, neoprene or synthetic material of suitable characteristics whereby a substantially complete vacuum seal is effected which will prevent intercommunication between individual segments. I have found that sponge rubber having a high percentage of new rubber has excellent qualities in this respect since it heals somewhat after each successive deformation and, in continued use, assumes a self-deformed configuration which is an effective dam between segments. Other grades of sponge rubber constituted partly of reclaimed rubber may also be used to advantage which will be resilient and self-deformable, just so long as they do not flow to undesirable deformation when subjected to the normal temperatures which are encountered in the particular filtration process or soften or otherwise deteriorate from contact with the chemicals used.

The sectional configuration of the resilient sealing member 34 may be regular as a rectangle with proportions depending upon the size of the filter and its component parts, or it may be constructed having substantially flat top and bottom faces with tapered sides conforming to the angular side supporting pieces. In any case it is desirable that the sealing member be such that it may be inserted by hand or with simple tools between the angular side pieces 33, 33' so that replacements may be readily made in service. It is important that the width of resilient member 34 be slightly greater than the spacing between the angle pieces so that it will be snugly retained in place during filter operation. There can be no leakage between plate 30 and the sealing member 34 because of the wrap of cords about the cylinder tending to compress the two members together, and hence there is no necessity for sealing the joint between the angular strips 33, 33' and the plate 30.

As an alternative construction the angular strips 33, 33' may be fixed directly to the drum surface as shown in Figure 3 as by soldering or other suitable fastening means. In using this type of construction it is possible to decrease the spacing between the drum surface and the web 13 and to thereby prevent extreme arching of the cords. Likewise, to further decrease the spacing between the cylindrical drum surface and the web, it is desirable to scallop the edges of the angular strip members 33, 33' as shown in Figure 4.

In the operation of the filter the web element 13 tightly encompasses the surface of the drum by proper deployment of the cord convolutions. Adequate seal is effected across the drum between the adjacent cord convolutions by the proper spacing thereof on the drum cylinder. The effluent from the liquid to be filtered is drawn between the interstices of adjacent cord convolutions permitting an accumulation of cake on the outside of the web as the drum rotates and as the web is carried through the tank of liquid being filtered. All of the segments lying in the vacuum zone described heretofore will have vacuum applied to them, and when the web of cords leaves the cylinder at the discharge line the vacuum will be released from those segments lying between the discharge line A and the line B in the tank. Thus, adding the improved sealing devices across the drum described there will be no possibility of loss of vacuum at discharge or at entry into the tank which would tend to make cake release more difficult or which would tend to reduce the effectiveness of the filter.

Now, having described the prefered embodiment of my invention reference will be had to the following claims for a determination of the scope of the invention.

I claim as my invention:

1. A continuous rotary drum filter comprising a drum having a succession of angularly extending vacuum chambers around its circumference, a group of cords spaced from one another axially around the drum and extending around a substantial portion of the circumference of the drum, a second group of cords extending around a substantial portion of the drum circumference, outside of the cords of the first group, each of the cords of the second group bridging the space between two successive cords of the first group and overlying a portion of each of the cords on opposite sides of said space, vacuum seals between the successive chambers, each of said seals including two holder elements extending across substantially the entire length of the drum and extending substantially parallel with one another but with their confronting faces forming a dove-tail groove and with their upper edges scalloped and so correlated with the cords that depressions of the scalloped edges underlie the individual cords of the first group and high points of the scalloped edges underlie the individual cords of the second group, and a solid resilient deformable sealing member having an uncompressed circumferential width greater than the minimum width of the dove-tail groove, said sealing member being held on the drum by the dove-tail groove and extending above the scalloped upper edges of the holder, and said sealing member being constructed of soft material which is deformed by the cords to fill the spaces under the cords of the second group and between the cords of the first group to provide a vacuum seal under the cords and between the successive vacuum chambers.

2. A continuous rotary drum filter, including, in combination, a drum in which there are a succession of vacuum chambers along successive areas of the circumference of the drum, and across which cords extend circumferentially around the drum to provide a filtering medium, said cords including a group of cords spaced from one another axially around the drum and extending around a substantial portion of the drum, a second group of cords extending around a substantial portion of the drum circumference, outside of the cords of the first group, each of the cords of the second group bridging the space between two successive cords of the first group and overlying a portion of each of the cords on opposite sides of said space, a sealing element extending lengthwise of the drum between each of the vacuum chambers, the sealing element being constructed of resilient material of substantially continuous cross section, and said sealing element extending outwardly into the space between alternate cords and into contact with the cords that are most distant from the drum axis as well as the cords that are closer to the drum axis, a holder for each sealing element, the holder being attached to the sealing element and also attached to the face of the drum and extending outwardly from the face of the drum along radially and axially extending surfaces of the sealing element for holding the lower portion of the sealing element against displacement, the radial height of the outward extent of the holder, under at least the cords of the first group, being less than the maximum radial extent of the sealing element by a distance at least as great as the difference in the spacing of the successive cords from the center of rotation of the drum.

3. A continuous rotary drum filter comprising a drum having a succession of angularly extending vacuum chambers around its circumference, a group of cords spaced from one another axially along the drum and extending around a substantial portion of the circumference of the drum, a second group of cords extending around a substantial portion of the drum circumference outside of the cords of the first group, each cord of the second group bridging the space between two successive cords of the first group and overlying a portion of each of the cords on opposite sides of said space, vacuum seals between the successive chambers, each of said seals comprising a solid and resilient sealing element extending radially from the drum throughout the full length of the drum, and fastening means securing each of said elements to the outside surface of the drum and holding the element against circumferential movement on the drum, the outer end portion of said sealing element being unconfined circumferentially and radially for a radial depth substantially greater than the difference in the radial spacing of the cords of the first and second groups from the axis of the drum, and said sealing element being constructed of soft material that fills the spaces between the first group of cords up to the arcuate under-surfaces of the cords of the second group, the fastening means comprising a holder with supports located both ahead of and behind the sealing elements, and each of said supports having a scalloped top edge with a depression of the scalloped edge under each of the cords of the first group so that the sealing element has transverse support from the holder for a greater height under the cords of the second group than under the cords of the first group.

ARTHUR WRIGHT.

REFERENCES CITED

The following references are of record in the file of this patent:

UNITED STATES PATENTS

| Number | Name | Date |
|---|---|---|
| 1,368,618 | Faber | Feb. 15, 1921 |
| 1,799,775 | Berry | Apr. 7, 1931 |
| 1,812,812 | Street | June 30, 1931 |
| 1,892,306 | Hillier | Dec. 27, 1932 |
| 2,247,460 | Wright | July 1, 1941 |
| 2,338,777 | Millspaugh | Jan. 11, 1944 |
| 2,348,340 | Goodwillie | May 9, 1944 |
| 2,426,886 | Kromline | Sept. 2, 1947 |